Sept. 8, 1936.     K. M. KEITH ET AL     2,053,795
GRAIN DRILL
Filed July 29, 1935     4 Sheets-Sheet 1

INVENTORS
KENNETH M. KEITH.
BY ORVILLE J. PARKS.
ATTORNEY

Sept. 8, 1936.  K. M. KEITH ET AL  2,053,795

GRAIN DRILL

Filed July 29, 1935  4 Sheets-Sheet 2

INVENTORS
KENNETH M. KEITH.
BY ORVILLE J. PARKS.

ATTORNEY

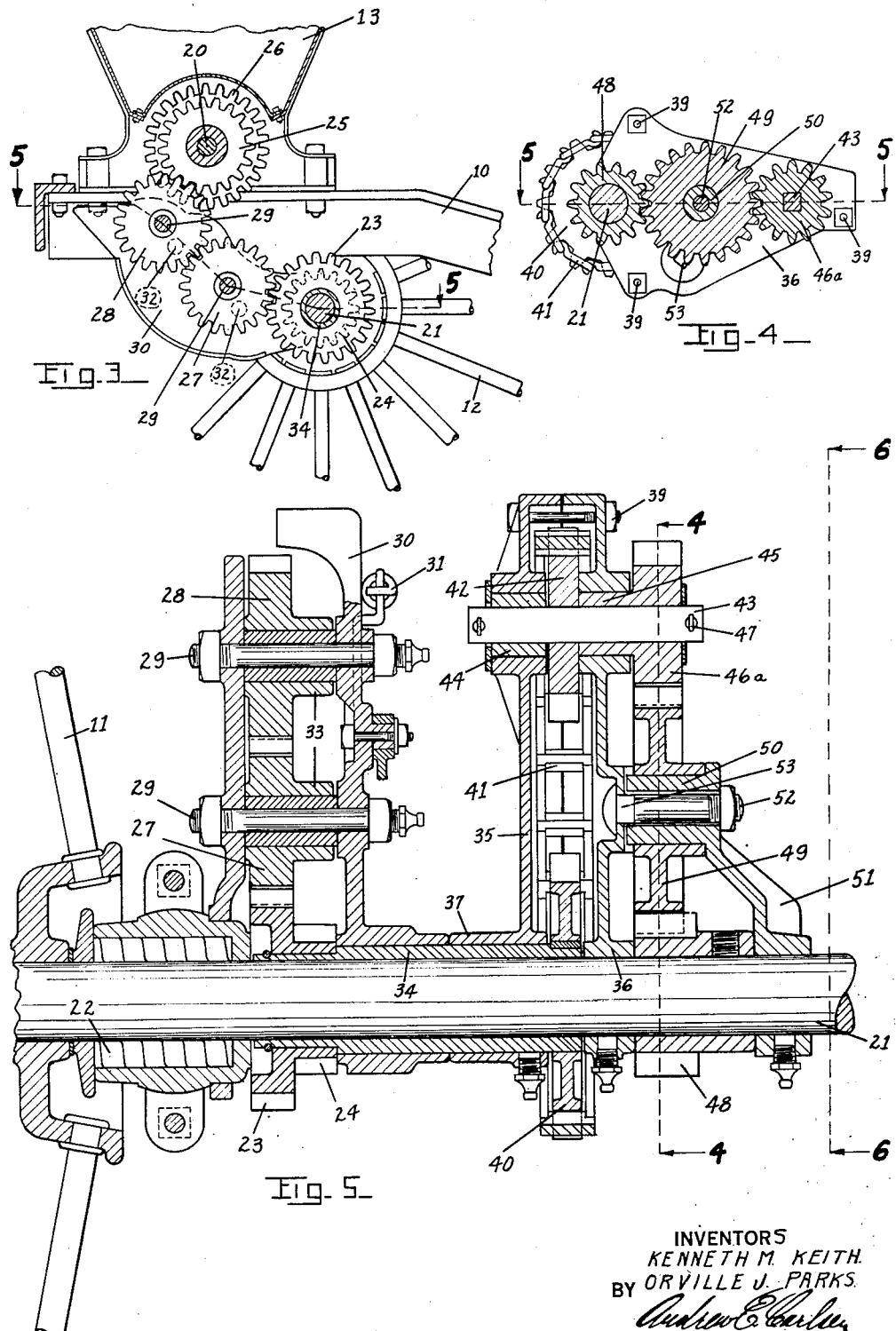

Sept. 8, 1936.   K. M. KEITH ET AL   2,053,795
GRAIN DRILL
Filed July 29, 1935   4 Sheets-Sheet 4

INVENTORS
KENNETH M. KEITH.
BY ORVILLE J. PARKS.
ATTORNEY

Patented Sept. 8, 1936

2,053,795

UNITED STATES PATENT OFFICE 2,053,795

GRAIN DRILL

Kenneth M. Keith, Minneapolis, and Orville J. Parks, Hopkins, Minn., assignors to Minneapolis-Moline Power Implement Company, Minneapolis, Minn., a corporation of Delaware Application July 29, 1935, Serial No. 33,680

13 Claims. (Cl. 111—52)

This invention relates to grain drills, and the main object is to provide a multiple selective speed transmission for transmitting power from the drive shaft or axle of the drill to the feed shaft of a series of seed feed devices, which transmission is not only efficient and practical in use, but is also comparatively simple in design, economical of manufacture, and simple to adjust and operate. More specifically we provide a selective seed feed transmission which by employing conventional spur gear and sprocket elements eliminates the necessity of cone gears, bevel pinions, angular bracket arrangements, etc., such as have heretofore been used and which involve more complicated structure and relatively greater manufacturing and replacement costs.

In the accompanying drawings, which illustrate a preferred embodiment of the invention:

Fig. 3 is a sectional detail elevation on the line 3—3 in Fig. 1, but with certain speed selective gears in high as distinguished from the low speed arrangement of Figs. 1 and 5.

Fig. 4 is a sectional detail elevation on the line 4—4 as taken in either Fig. 1 or Fig. 5.

Figure 1:
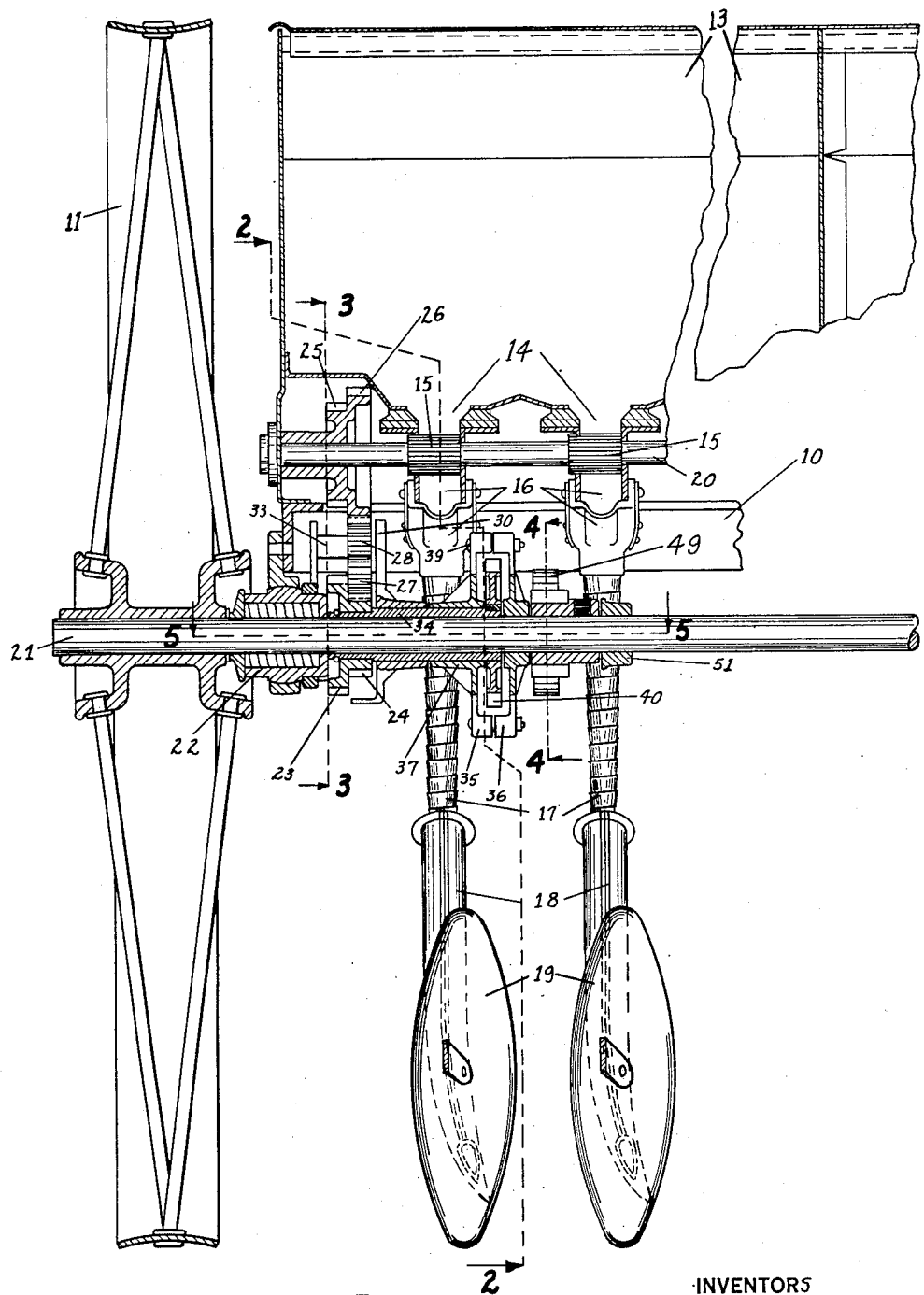
Fig. 1 is a sectional elevation through the right end of the machine as seen when looking to the rear, as on the line 1—1 in Fig. 2, the right end of the machine being considered the end on the right hand when facing in the forward direction of travel.
Figure 2:
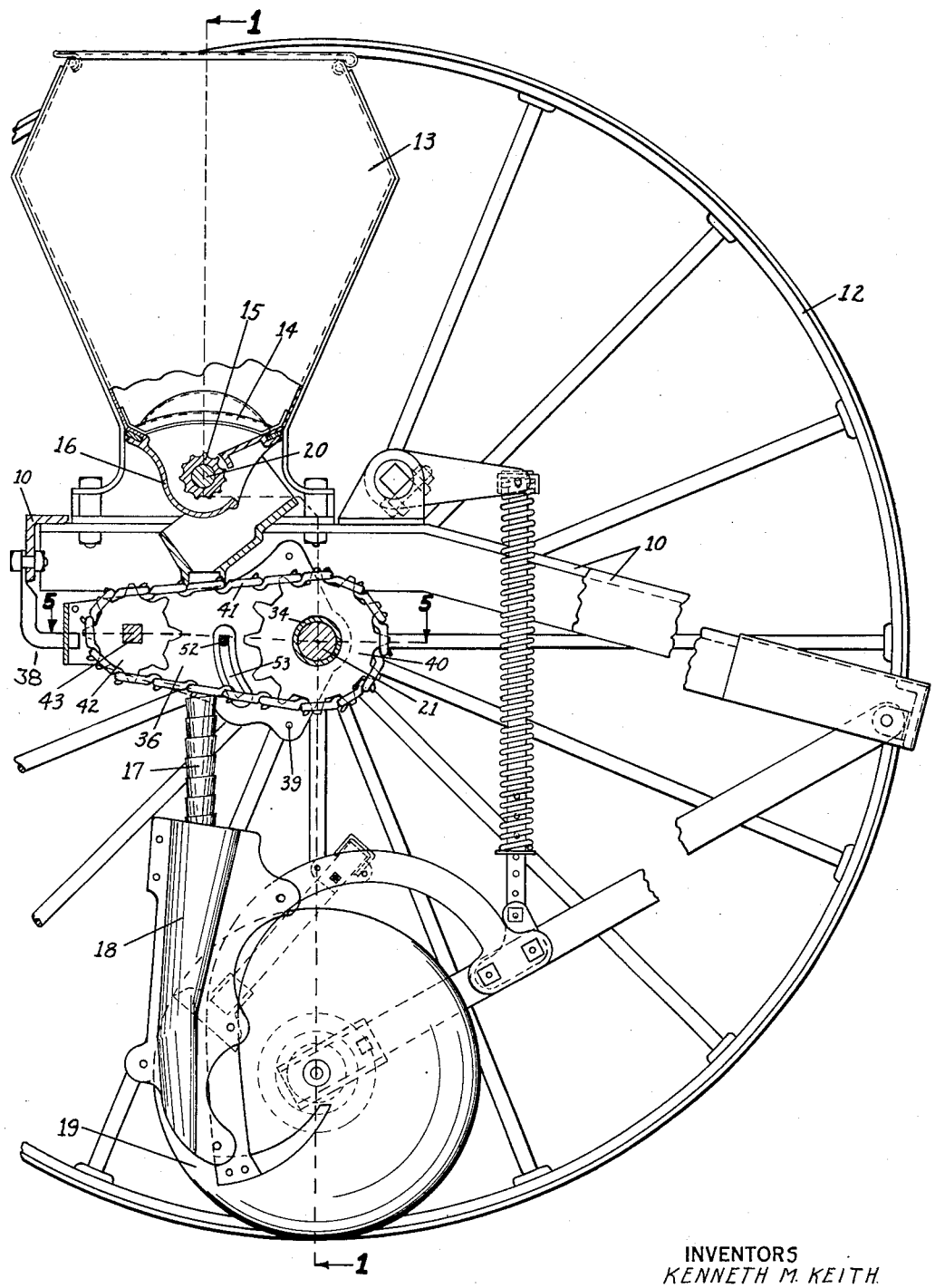
Fig. 2 is a sectional elevation on the line 2—2 in Fig. 1, looking toward the left ground wheel.

Fig. 5 is an enlarged compound sectional plan view through substantially the entire transmission mechanism, this section being taken in part on line 5—5 in Fig. 1, in part on line 5—5 in Fig. 3, and in part on lines 5—5 in Fig. 4 and Fig. 2.

Figure 6:
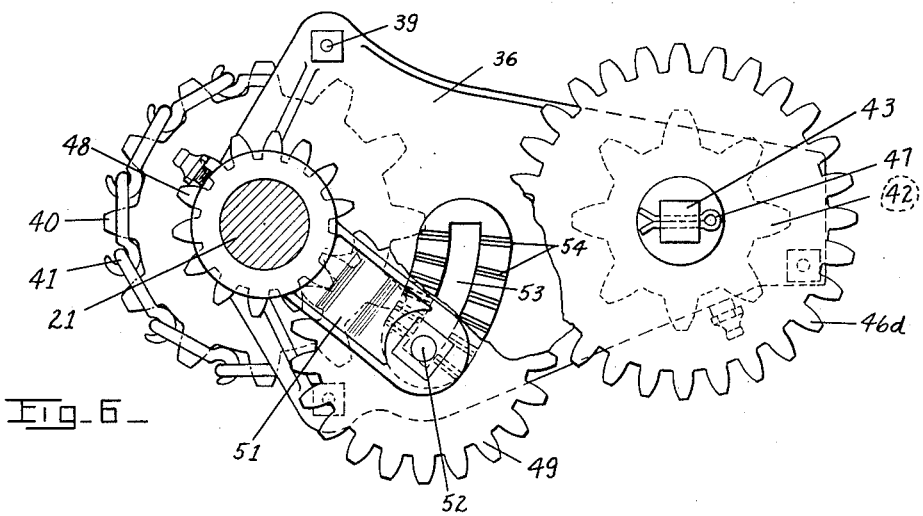

Fig. 6 is a detail elevation, partly in section, as on line 6—6 in Fig. 5, and with fractional portions broken away, but showing parts adjusted to include a selected intermediate speed change gear of different diameter than that disclosed in Fig. 5.

Figure 7:
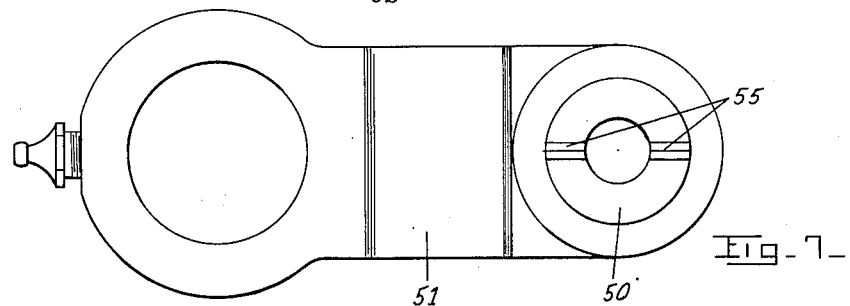

Fig. 7 is an enlarged detail view of the adjustable connector gear bracket as seen from its inner side and when removed from the multiple intermediate gear assembly.

Figures 8, 9:
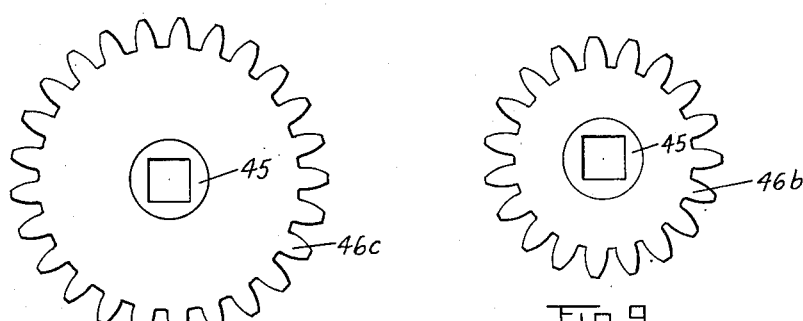

Figs. 8 and 9 are face views of conventional spur gears adapted to be interchanged with the intermediate speed selector gears shown in Figs. 4 and 6, but are of relatively different sizes so as to multiply the intermediate speed selectivity ratios obtainable.

Except for the power transmission mechanism and its coordinated adaptation to other elements, the machine as a whole is of more or less conventional design and includes a main frame 10 supported on ground wheels 11 and 12, and carries a transversely extended seed hopper 13 having bottom openings 14 through which the grain or other seed is fed by feed rolls 15 into cups 16 and from thence pass down through tubes 17 to the planter spouts 18 of furrow openers 19. The feed rolls 15 are secured on and driven by feed shaft 20 which is driven at various selected speeds from the drive shaft or axle 21 rotated by ground wheels 11 and 12 and journaled in suitable bearings 22 on the main frame 10. The axle 21 and feed shaft 20 are preferably divided, longitudinally, so that each ground wheel will drive only the feed rolls under one half of the hopper, and consequently corresponding transmission mechanisms are required at both ends of the machine. Such mechanisms are substantially identical, however, and therefore only one will be disclosed and described.

The feed shaft power transmission mechanism comprises a primary high and low speed selector train and a secondary speed selector device for establishing various intermediate speeds; and the arrangement is such that any one of the intermediate speeds may be used with either the high or low primary speeds, with a result that a wide range of selected speed combinations is obtainable.

The primary speed selector train includes a double high and low spur gear unit 23—24 on the axle 21, a high and low spur gear unit 25—26 on the feed shaft 20, and a pair of intermediate gears 27 and 28 rotatable on pins 29 of a gear bracket 30, the forward end of which is trunnioned about the axle 21 and the rear end of which is yieldingly supported by a spring 31. As shown in Figs. 3 and 5, the gears 27 and 28 interconnect the high speed axle and feed shaft gears 23 and 25, respectively. To establish the low speed connection the gears 27 and 28 are reversed end to end on the bolts 29, and the bolts are in turn placed in other bracket holes 32 (Fig. 3), and as the intermediate gears have laterally extended hubs 33, on one side only, the gears will, when reversed, be transposed from meshing alignment with gears 23 and 25 to meshing alignment with gears 24 and 26. This arrangement and transposition is disclosed in greater detail in our copending application Ser. No. 30,240 filed July 8, 1935, for Grain drill, and in which application it is additionally disclosed how one large gear may be substituted for the two intermediate gears to reverse the direction of feed shaft rotation which is desired under certain circumstances.

In our aforesaid copending application Ser. No. 30,240, the double drive gear unit (70—71) corresponding to the present unit 23—24 is non-rotatably fixed on the drive axle so as to have a fixed speed of rotation with respect to the ground wheel which supports the axle. In the present instance the gear unit 23—24 is not fixed on the shaft 21 but is fixed on a sleeve or tube 34 so as to be rotated thereby, and this tube is rotatable about the axle so that it can be turned at greater or lesser speeds than if fixed thereon.

The intermediate speed selecting and power transmitting device comprises a two section bracket 35—36, one section 35 of which has a hub 37 rotatably embracing the sleeve 34 while the complemental section 36 is trunnioned on axle 21 immediately adjacent one end of the sleeve. The rear end of the bracket is held suspended from the frame 10 by a hook 38 (Fig. 2), and the bracket sections are secured together by tie bolts 39.

A sprocket gear 40, fixed on one end of the sleeve 34, is driven by a sprocket chain 41 from a sprocket pinion 42 carried by a square shaft 43 in the rear end of the bracket 35—36. The shaft is journaled in the bracket by a bushing 44 at one end, and by the hub 45 of a spur pinion 46a (46b, 46c, or 46d). The spur pinions 46a, 46b, 46c, and 46d are all of different outer diameters but have the same hub and shaft sizes so as to be interchangeable on the shaft, they being releasably secured thereon by suitable means such as a removable cotter pin 47.

A spur gear 48 is fixed on the axle 21 and driving connection between it and the selected pinion 46 is effected by an intermediate idler spur gear 49. The gear 49 is trunnioned on a bearing hub 50 of a control arm 51 which is swingable in an arc about axle 21 with a result that gears 48 and 49 always remain in mesh, although the gear 49 is movable with respect to the axis of shaft 43 so that the gear 49 may be moved into meshing engagement with any selected gear 46. Thus in Figs. 4 and 5 the comparatively small selected gear 46a necessitates the placement of gear 49 at an intermediate position between gears 48 and 46a, whereas in Fig. 6, where the speed selector gear 46d is of comparatively larger diameter the arm 51 and gear 49 are adjusted to relatively lower positions.

In order to correctly adjust and positively secure the gear 49 in proper operative position with respect to the gear 46 selected we extend a bolt 52 through the bearing hub 50 and through an arcuate slot 53 in the bracket section 36. The section surface adjacent the slot is also provided with spaced, radially disposed notches 54 for selective engagement by teeth 55 projecting integrally from one end of the hub 50. The notches 54 are so arranged that each setting of the arm 51 with respect thereto will accommodate a predetermined size of gear 46. By tightening the bolt 52 the intermediate gear will of course be firmly held in the selected operative position.

In the operation and use of the device the desired feed shaft speed rotation is first determined upon by the species, quality, size, etc., of seed to be planted and the relative amount of seed desired to be distributed over a predetermined acreage or ground area. These factors being known, the operator then proceeds to select the gearing arrangement that will give the desired results, a prearranged chart or gear schedule preferably being followed. As already noted, the position of gears 27 and 28 determines the maximum and minimum initial high and low speed settings, depending upon whether they operatively connect gears 23 and 25 or gears 24 and 26. Various intermediate or supplemental speed selections are obtained by interchanging the size graduated gears 46a, 46b, 46c, and 46d, of which any suitable number may be used, and for each of which there is a high and low speed combination through gears 27—28.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a grain drill, the combination with a driving shaft and a grain feed shaft to be driven thereby, of a sleeve rotatable on the driving shaft, power connections between the sleeve and the feed shaft, and a speed selecting power transmission mechanism connecting the sleeve and driving shaft comprising an outer shaft the axis of which is laterally spaced from and parallel with the axis of the driven shaft, and driving connections from the driving shaft to the outer shaft and from the latter to the sleeve.

2. In a grain drill, the combination with a driving shaft and a grain feed shaft to be driven thereby, of a rotatable member trunnioned on the driving shaft and having driving connection with the feed shaft, a second rotatable member spaced from and operating on an axis parallel with respect to the axes of both the feed shaft and the first rotatable member, power connection between said rotatable members, and a train of spur gears for transmitting power from the driving shaft to the second rotatable member.

3. In a grain drill, the combination with a driving shaft and a grain feed shaft to be driven thereby, of a rotatable member having driving connection with the feed shaft, a second rotatable member spaced from and operating on an axis parallel with the grain feed shaft, sprocket gears on the said rotatable members, a sprocket chain connecting said gears and a spur gear connection between the driving shaft and the said second rotatable member.

4. In a grain drill, the combination with a driving shaft and a grain feed shaft to be driven thereby, of a rotatable member mounted concentrically with respect to the driving shaft and having driving connection with the feed shaft, a second rotatable member spaced from and operating on an axis parallel with the first rotatable member, sprocket means connecting the said rotatable members, and a spur gear connection between the driving shaft and the said second rotatable member, said spur gear connection including an adjustable gear support adapted to selectively accommodate interchangeable spur gears of different diameters.

5. In a machine of the character described, the combination with a driving shaft and a second shaft to be driven thereby, of a sleeve rotatable on the driving shaft, power connections between the sleeve and the driven shaft, a bracket extending from the driving shaft, a third shaft journaled in the outer end of the bracket and in parallelism with the driving shaft, power connection comprising a pair of sprocket gears and a cooperating sprocket chain between said third shaft and the sleeve, and a spur gear train connecting the third shaft with the driving shaft.

6. In a machine of the character described, the combination with a driving shaft and a second shaft to be driven thereby, of a sleeve rotatable on the driving shaft, power connections between the sleeve and the driven shaft, a bracket extending from the driving shaft, a third shaft journaled in the outer end of the bracket and in parallelism with the driving shaft, power connection between said third shaft and the sleeve, and a spur gear train connecting the third shaft with the driving shaft, said spur gear train including an intermediate spur gear adjustable in an arc about the axis of an adjacent gear to maintain meshing engagement therewith while radially adjustable with respect to another intermeshing gear whereby such last mentioned gear may be interchanged for other gears, differing in diameter, to change the speed ratio between the driving shaft and said sleeve.

7. In a machine of the character described, the combination with a driving shaft and a driven shaft, of a sleeve rotatable on the driving shaft, selective high and low speed connections between the sleeve and the driven shaft, and an intermediate speed selecting mechanism transmitting power from the driving shaft to the sleeve and comprising a train of spur gears, one of which is removable and interchangeable with other spur gears of different diameters selectively substituted therefor to change the transmitted speed ratios.

8. In a machine of the character described, the combination with a driving shaft and a driven shaft, of a sleeve rotatable on the driving shaft, selective high and low speed connections between the sleeve and the driven shaft, and an intermediate speed selecting mechanism transmitting power from the driving shaft to the sleeve and comprising a train of spur gears, one of which is radially adjustable with respect to an adjacent spur gear whereby the latter may be removed and interchanged for another gear of different diameter.

9. In a grain drill, the combination with a drive shaft and a grain feed shaft, of a rotatable member trunnioned upon the drive shaft and having driving connection with the feed shaft, a third shaft parallel with the drive shaft and having driving connection with the rotatable member, spur gears on the drive shaft and said third shaft, an intermediate spur gear for establishing driving connection between said spur gears, means for adjustably mounting said intermediate spur gear whereby it may be adjusted in an arc about the axis of the spur gear on the drive shaft to permit the spur gear on the third shaft to be interchanged with gears of other diameters.

10. In a grain drill, the combination with a drive shaft and a grain feed shaft, of a rotatable member mounted for rotation on an axis concentric with the drive shaft and having driving connection with the feed shaft, a third shaft parallel with the drive shaft and having driving connection with the rotatable member, spur gears on the drive shaft and said third shaft, an intermediate spur gear for establishing driving connection between said spur gears, and an adjustable arm swingable in an arc about the drive shaft for supporting said intermediate gear.

11. In a grain drill, the combination with a shaft and a seed feeding device, of a sleeve rotatable about the shaft and having driving connection with the feeding device, a bracket extending from the shaft adjacent the sleeve and having a sprocket gear at its outer end, a sprocket gear on the sleeve, a sprocket chain connecting the sprocket gears, a spur gear associated with the first mentioned sprocket gear, a spur gear on the shaft, an arm swingable on the shaft and having one end adjustably secured to the bracket, and an intermediate gear carried by said arm for establishing driving connection between said spur gears.

12. In a grain drill, the combination with a shaft and a seed feeding device, of a sleeve rotatable about the shaft and having driving connection with the feeding device, a bracket extending from the shaft adjacent the sleeve and having a sprocket gear at its outer end, a sprocket gear on the sleeve, a sprocket chain connecting the sprocket gears, toothed gears associated with said first mentioned sprocket gear and the shaft, an intermediate gear for connecting said toothed gears, an arm swingable in an arc about the axis of one of the toothed gears and for supporting said intermediate gear, said bracket having an arcuate slot adjacent said intermediate gear, and means engageable in said slot for adjustably securing the arm to the bracket.

13. In a grain drill, the combination with a shaft and a seed feeding device, of a sleeve rotatable about the shaft and having driving connection with the feeding device, a bracket extending from the shaft adjacent the sleeve and having a sprocket gear at its outer end, a sprocket gear on the sleeve, a sprocket chain connecting the sprocket gears, toothed gears associated with said first mentioned sprocket gear and the shaft, an intermediate gear for connecting said toothed gears, an arm swingable in an arc about the axis of one of the toothed gears and for supporting said intermediate gear, said bracket having an arcuate slot adjacent said intermediate gear, and means engageable in said slot for adjustably securing the arm to the bracket, said bracket having spaced recesses and said arm having means for releasable and selective engagement in the recesses.

KENNETH M. KEITH.
ORVILLE J. PARKS.